United States Patent [19]

Izumi

[11] Patent Number: 4,932,780

[45] Date of Patent: Jun. 12, 1990

[54] INTERFEROMETER

[75] Inventor: Akio Izumi, Kanagawa, Japan

[73] Assignee: Fuji Electric Co., Ltd., Kanagawa, Japan

[21] Appl. No.: 116,233

[22] Filed: Nov. 3, 1987

[30] Foreign Application Priority Data

Nov. 5, 1986 [JP] Japan .................. 61-262968
Mar. 30, 1987 [JP] Japan .................. 62-77269

[51] Int. Cl.$^5$ .............................................. G01B 9/02
[52] U.S. Cl. ...................................... 356/346; 356/358
[58] Field of Search ................. 356/346, 358; 350/173

[56] References Cited

U.S. PATENT DOCUMENTS 4,632,553 12/1986 Vidrine et al. ...................... 356/346
4,779,983 10/1988 Learner et al. ..................... 356/346

FOREIGN PATENT DOCUMENTS 0236137 9/1987 European Pat. Off. ............ 356/346

Primary Examiner—Davis L. Willis
Assistant Examiner—Matthew W. Koren
Attorney, Agent, or Firm—Finnegan, Henderson, Farabow, Garrett and Dunner

[57] ABSTRACT

In an interferometer comprising a beam splitter made up of a parallel planar plate and translucent (that is, semi-reflecting) films formed on both sides thereof, and a pair of reverse reflectors disposed at predetermined distances from the two surfaces of the beam splitter, an incident beam is split into two beams by one of the translucent films, and the two beams are reflected by the reverse reflectors, thus interfering with each other at the other translucent film.

17 Claims, 15 Drawing Sheets

FIG. 15A
FIG. 15B
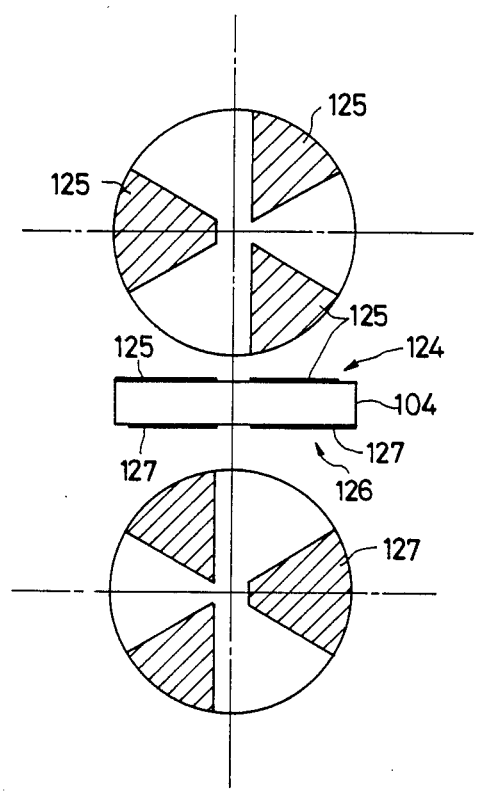
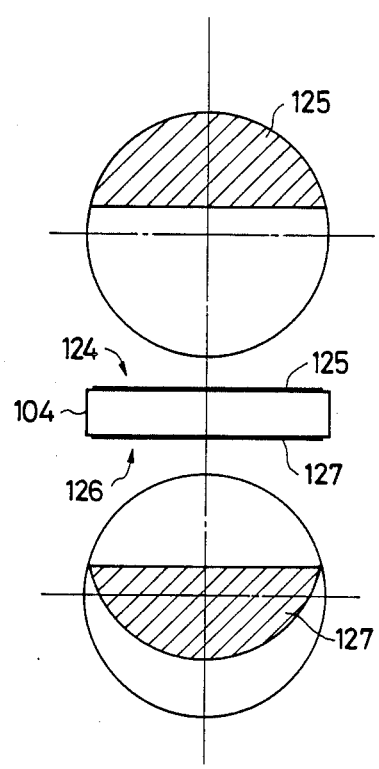

INTERFEROMETER

BACKGROUND OF THE INVENTION

1. Field of the Invention

This invention relates to an interferometer in which a light beam is split into two light beam by a beam splitter, and the two light beams, after being made different in optical path length, are caused to interfere with each other by means of a beam splitter. An interferometer of this type has a wide range of applications, being used for example as a means for inspecting optical components, a range finder, or an interference spectrometer.

2. Prior Art

One example of a device utilizing an interferometer of this type, namely, a double interference spectrometer is shown in FIG. 7. In FIG. 7, a light beam from a light source 1, after passing through an aperture 2, is made into a parallel light beam by a collimating reflecting mirror 3. The parallel light beam thus formed is split into two light beams 6 and 7 by means of a translucent (that is semi-reflecting) film 5 which is formed on a substrate 4 for instance by vacuum deposition. The substrate 4 is generally a parallel planar plate which transmits light sufficiently. In the case of a spectroscope for visible range, the substrate is made of glass or molten quartz. In the case of a spectroscope for infrared range, a single crystal of KBr, CsI or KRS-5 is employed to form the substrate 4. In the case of a spectroscope for far infrared range, it is unnecessary to use the substrate 4 and a correcting plate 8, and a macromolecular film of polyethyleneterephthalate or the like is employed as the translucent film 5.

The correcting plate 8 is equal both in material and in thickness to the substrate 4. The correcting plate 8 is disposed in such a manner that the translucent film 5 is located between the plate 8 and the substrate 4. For instance when the light beam is split into two light beams at the point A, the two light beams, being reflected respectively by a movable plane mirror 9 and a stationary plane mirror 10, interfere with each other at the point B. If, in this case, no correcting plate 8 is provided beside the substrate 4, the beam 7 will pass through the substrate 4 twice after the beam splitting operation, while the beam 6 will not pass through the substrate 4 at all. Since the refractive index of the substrate 4 depends on the wavelength of light, the optical distance between the stationary reflecting mirror 10 and the translucent film 5 changes with the wavelength. In the case where it is required for the two light beams to interfere with each other with a constant difference in optical path length irrespective of the wavelength, it is necessary to insert the correcting plate 8 equal both in thickness and in material to the substrate 4 in the light beam 6, thereby to provide an optical distance for the light beam 6 which depends on the wavelength similarly as in the light beam 7.

In the double beam interference spectrometer of FIG. 7, all light beams in its spectral wavelength range should undergo interference with the same difference in optical path length, and it is essential to use the correcting plate 8.

A drive device 11 is to move the movable plane mirror 9. Its movement, i.e., the difference in optical path length between the light beams 6 and 7 is detected by a laser interference length measuring machine 12 in laser wavelengths and applied to a computer 13 in real time. If the movable plane mirror 9 and the stationary plane mirror 10 are inclined even slightly, the light beam reflection direction and the optical path length difference involve errors which will considerably adversely affect the measurement. Therefore, in general, the drive device 11 (uses air bearings, and the stationary plane mirror 10 is provided with an elevation angle adjusting device so that the angle of elevation of the mirror 10 is adjusted periodically.

The light beams thus subjected to interference with the predetermined optical path length difference are applied to a specimen 15 by an illuminating mirror 14, where rays different in wavelength are absorbed according to the spectral characteristic of the specimen 15. The light beam passed through the specimen 15 and reflected by a mirror 16 is applied to a detector 18 by a detecting mirror 17. The output of the detector 18 is applied, as an electrical input, to the computer 13. In the computer 13, the detector output as a function of the optical path length difference measured with the laser interference length measuring machine is stored as data, and after the data have been stored as much as the predetermined optical path length difference, the spectral characteristic is obtained by Fourier transformation.

The substrate 4 and the translucent film 5 forming a beam splitter together with the correcting plate 8 are shown in FIG. 8 in more detail. In general, the substrate 4 is in the form of a disk, and its diameter should be about 10% of the diameter because it must be polished as described later. The substrate 4 and the correcting plate 8 are made of a transparent material. For an intermediate infrared region, they are generally made of an expensive KBr single crystal. The surfaces of the substrate 4 and the correcting plate 8 must be optically polished; however, the polishing cost is considerably high because a KBr single crystal is relatively soft and deliquescent. Furthermore, the substrate 4 and the correcting plate 8 must be equal in thickness, and in the case of a high resolution spectrometer the thickness tolerance should be of the order of $\pm 10$ $\mu$m. Thus, in addition to the polishing operation, the operation of making the substrate and the correcting plate equal in thickness is required. This will further increase the manufacturing cost. For a visible range, the substrate and the correcting plate can be made of molten quartz; i.e., the material cost is relatively low; however, because of the short measurement wavelength they must be polished higher in flatness than those for infrared range. In addition, the difference in thickness between the substrate 4 and the correcting plate 8 must be small. Thus, the manufacturing cost of the beam splitter for visible range is substantially equal to that of the beam splitter for intermediate infrared range. That is, the beam splitter 19 makes up a large part of the manufacturing cost of the spectrometer, being 20% to 40% of the direct material cost of the spectrometer excluding the computer 13.

When compared with a grating type spectroscope, the interference spectrometer has been markedly improved in sensitivity, and extensively employed in the industry, thus becoming, an essential instrument in the high technical industry. However, the interference spectrometer is much more expensive than the grating type spectroscope. In the spectrometer body, the beam splitter 19 and the computer 13 required for Fourier transformation are main factors of the high manufacturing cost. A computer 13, less expensive but more capable, has been developed with the advancement of electronics. On the other hand, a beam splitter 19 is fundamentally the same as that which was proposed several decades ago. Therefore, there has been a strong demand for the provision of a beam splitter 19 of improved performance and decreased manufacturing cost.

SUMMARY OF THE INVENTION

Accordingly, an object of this invention is to provide an interferometer with a novel beam splitter of improved performance and decreased manufacturing cost.

The foregoing object and other objects of the invention have been achieved by the provision of an interferometer which, according to the invention, comprises: a beam splitter which is a parallel planar plate whose both surfaces are translucent surfaces; and two reverse reflectors arranged at predetermined distances from both surfaces of the beam splitter, respectively.

In the interferometer of the invention, an incident light beam is split into two beams by one surface of the beam splitter, and the two beams are reflected by the reverse reflectors, so that they interfere with each other on the other surface of the beam splitter. Therefore, the interferometer of the invention needs no correcting plate which is required by the conventional interferometer. Furthermore, it is unnecessary for the interferometer of the invention to use a material such as KBr which is deliquescent and is difficult to polish or vacuum-deposit. Therefore, the interferometer of the invention is high in resistance against environmental conditions and is stable in operation.

The nature, principle and utility of the invention will become more apparent from the following detailed description when read in conjunction with the accompanying drawings.

BRIEF DESCRIPTION OF THE DRAWINGS

In the accompanying drawings:

FIGS. 11, 12A, 12B, 13, 15A, 15B and 16 are diagrams showing embodiments of the beam splitter according to the present invention.

DETAILED DESCRIPTION OF THE INVENTION

In order to fully understand the invention, first the construction of a reverse reflector will be described.

Figure 10A:
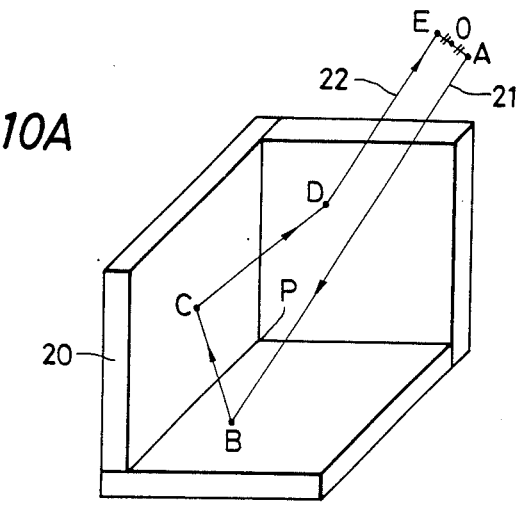
FIGS. 10A, 10B and 10C are diagrams for a description of the operation of a reverse reflector.

An example of the reverse reflector, namely, a corner cube reflector 20 is shown in FIG. 10A. More specifically, FIG. 10A shows an external view of the corner-cube reflector 20 consisting of three plane mirrors which are perpendicular to one another. An incident light beam 21 is reflected by the three mirrors three times. The resultant light beam, namely, a reflected light beam 22 is in parallel with the incident light beam 21 but its direction is opposite to the direction of the incident light beam 21.

Figure 10B:
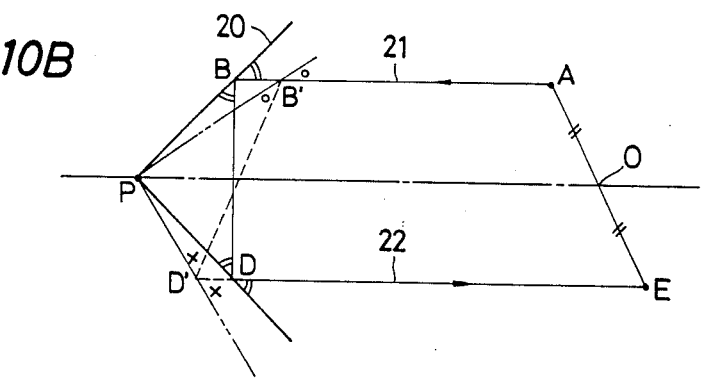

FIG. 10B shows the reflection of the corner-cube reflector in two-dimensions. The incident light beam 21 from the point A is reflected at the points B and D, thus becoming the reflected light beam 22 which reaches the point E. When the corner-cube reflector 20 swings about the point P as indicated by the two-dot chain lines in FIG. 10B, then the reflection points are shifted to B' and D'; however, the reflected light beam 22 is maintained unchanged in position and in direction, and $\overline{AB}\ \overline{DE} = \overline{AB'D'E} = 2 \times \overline{OP}$. The same relationship can be geometrically proved for three-dimensional case.

Figure 10C:
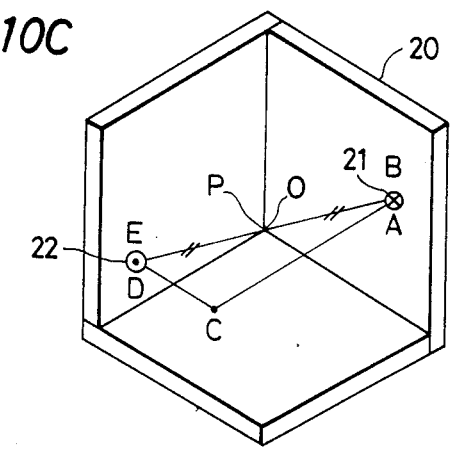

FIG. 10C shows the corner-cube reflector 20 with the mirrors viewed at an equal angle. The incident light beam 21 is perpendicular to the drawing and is reflected as indicated by the solid lines, thus becoming the reflected light beam 22. In FIG. 10C, the points A and E, and the points B and D are symmetrical with respect to the vertex P, because the reflector is viewed along the light beam 21 (or along the reflection direction of the light beam 22). If the reflector is swung about the vertex P, the length $\overline{ABCDE}$ is maintained unchanged, being equal to $2 \times \overline{OP}$.

Figure 2:
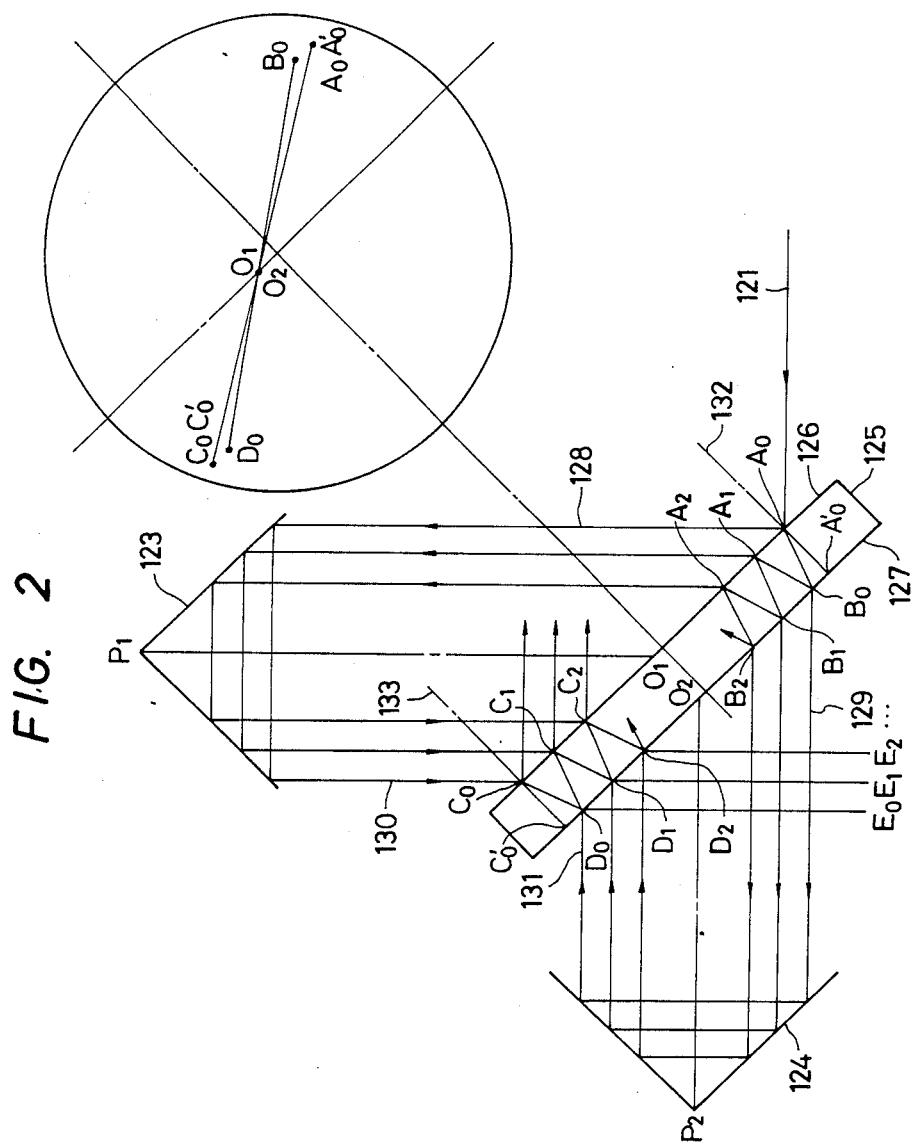
FIG. 2, 3 and 4 are explanatory diagrams showing embodiments of the interferometer according to the invention.

FIG. 2 shows a first embodiment of an interferometer according to the present invention. In the interferometer, a stationary corner-cube reflector 123 and a movable corner-cube reflector 124 are arranged with respect to a parallel planar plate 125 of germanium (Ge) as shown in FIG. 2. An incident light beam 121 is partially reflected by the front surface 126 of the parallel planar plate 125 at a point $A_0$. The light beam passed through the front surface 26 is partially reflected by the rear surface 127 of the plate 125 at a point $B_0$, and the remaining part of the light beam passes through the rear surface.

In FIG. 2, the axis which passes through the vertex $P_1$ of the stationary corner-cube reflector 123 and is parallel with the light beam 128 reflected at the point $A_0$ intersects the front surface 126 at a point $O_1$; and the axis which passes through the vertex $P_2$ of the movable corner-cube reflector 124 and is parallel with the light beam 129 transmitted through the rear surface 127 at the point $B_0$ intersects the rear surface 127 at a point $O_2$. The stationary corner-cube reflector 123 is adjusted with respect to the movable corner-cube reflector 124 with an X-Y stage provided for the reflector 123 so that $\overline{O_1O_2}$ is perpendicular to the front surface 126 (and accordingly to the rear surface 127). The direction of movement of the movable corner-cube reflector 124 is adjusted with an elevation angle control device (not shown) so that it is in parallel with the transmitted light beam 129 at the point $B_0$. With the corner-cube reflectors 123 and 124 arranged with respect to the parallel planar plate 125 in the above-described manner, the point $D_0$ where the light beam 130 reflected by the stationary corner-cube reflector 123 reaches the rear surface 127 of the plate 125 coincides with the point where the light beam 131 reflected by the movable corner-cube reflector 124 reaches the rear surface This will be proved.

Because of the laws of reflection and refraction, three straight lines; the reflected light beam 128, the refracted light beam $A_0B_0$, and the perpendicular 132 to the front surface 126 from the point $A_0$, are in one and the same plane (hereinafter referred to as "a plane $S_1$"). Similarly, the light beam 130, the refracted light beam $C_0D_0$ and the perpendicular 133 to the front surface 126 from the point $C_0$ are in one and the same plane (hereinafter referred to as "a plane $S_2$"). Because the light beams 128 and 130 are in parallel with each other and the perpendiculars 132 and 133 are also in parallel with each other, the planes $S_1$ and $S_2$ are in parallel with each other. Therefore, if the intersections of the perpendicular 132 and the rear surface 127 and of the perpendicular 133 and the rear surface 127 are designated by $A'_0$ and $C'_0$, respectively, then $A'_0B_0$ is the line of intersection of the plane $S_1$, and the rear surface 127, and $C'_0D_0$ is the line of intersection of the plane $S_2$ and the rear surface 127. Therefore, $A'_0B_0$ is in parallel with $C'_0D_0$, and both are equal in length to each other because of the same angle of refraction.

On the other hand, because of the nature of the stationary corner-cube reflector 123, the points $A_0$ and $C_0$ are symmetrical with respect to the point O, and the line $O_1O_2$ is adjusted perpendicular to the front surface 126 (and accordingly to the rear surface 127). Therefore, the point $A'_0$ and $C'_0$ are symmetrical with respect to the point O', and accordingly the points $B_0$ and $D_0$ are symmetrical with respect to the point $O_2$. The point where the reflected light beam 131 reaches the rear surface is symmetrical with the point $B_0$ with respect to the point $O_2$, and therefore it coincides with the point $D_0$, so that the light beams 131 and 130 interfere with each other.

The light beam reflected by the rear surface at the point $B_0$ is split into transmitted light beams and reflected light beams at the points $A_1$, $B_1$, $A_2$, $B_2$ and so forth, and these light beams interfere with each other at the points $C_1$, $D_1$, $C_2$, $D_2$ and so forth. The light beams interfering with each other on the front surface 126 at the points $C_1$, $C_2$ and so forth are returned to the light incidence side, while the light beams interfering with each other on the rear surface 127 at the points $D_0$, $D_1$, $D_2$ and so forth are provided as outputs of the interferometer. It is assumed that the quantity of incident light is 1, and the amplitude strengths of the emergent light beams provided through optical interference at the points $D_0$, $D_1$, $D_2$ and so forth are $E_0$, $E_1$, $E_2$ and so forth, respectively. For instance $E_2$ includes light beams advanced on various paths such as a light beam $A_0C_0D_0C_1D_1C_2D_2$, a light beam $A_0B_0A_1C_1D_1C_2D_2$ and a light beam $A_0B_0A_1B_1D_1C_2D_2$, and these light beams interfere with one another. It is assumed that the amplitude reflectance and the amplitude transmittance of the planar plate 125 and the air are represented by $r_1$ and $t$, respectively. Furthermore, it is assumed that the optical length (refractive index × length) of $A_0B_0$ with respect to a light beam having a wavelength λ is $l(λ)$, then for instance the amplitude of the light beam $A_0C_0D_0C_1D_1C_2D_2$ and the phase difference from the point $A_0$ are as follows:

$$\text{Amplitude} = (-r)trrrrt = r^5t^2 \tag{1}$$

$$\text{Phase difference} = \frac{2\pi}{\lambda}(2\overline{P_1O_1} + 5l(\lambda)) \tag{2}$$

The negative sign (−) of (−r) in equation (1) means the fact that when the light beam entering the parallel planar plate 125 from the air is reflected at the point $A_0$, the phase changes by π. The amplitude and phase difference equations can be combined as follows:

$$-r^5t^2 e^{\frac{2\pi i}{\lambda}(2\overline{P_1O_1}+5l(\lambda))}$$

The amplitudes and phase differences of $E_0$, $E_1$, $E_2$, ... and $E_n$ are as follows:

$$E_0 = -rt^2 \left( e^{\frac{i2\pi}{\lambda}(2\overline{O_1P_1}+l(\lambda))} + e^{\frac{i2\pi}{\lambda}(2\overline{O_2P_2}+l(\lambda))} \right) \tag{3}$$

$$E_1 = (-r^3t^2 + rt^4)\left( e^{\frac{i2\pi}{\lambda}(2\overline{O_1P_1}+3l(\lambda))} + e^{\frac{i2\pi}{\lambda}(2\overline{O_2P_2}+3l(\lambda))} \right) \tag{4}$$

$$E_2 = (-r^5t^2 + 2r^3t^4)\left( e^{\frac{i2\pi}{\lambda}(2\overline{O_1P_1}+5l(\lambda))} + e^{\frac{i2\pi}{\lambda}(2\overline{O_2P_2}+5l(\lambda))} \right) \tag{5}$$

$$E_n = (-r^{2n+1}t^2 + nr^{2n-1}t^4)\left( e^{\frac{i2\pi}{\lambda}(2\overline{O_1P_1}+(2n+1)l(\lambda))} + e^{\frac{i2\pi}{\lambda}(2\overline{O_2P_2}+(2n+1)l(\lambda))} \right) \tag{6}$$

$$(n = 1, 2, 3 \ldots)$$

$$= r^{2n-1}t^2(t^2 - r^2) e^{\frac{i2\pi}{\lambda}(2n-1)l(\lambda)} \left( e^{\frac{i2\pi}{\lambda} \cdot 2\overline{O_1P_1}} + e^{\frac{i2\pi}{\lambda} \cdot 2\overline{O_2P_2}} \right) \tag{7}$$

With energy reflection degree $R = r^2$, and energy transmission degree $T = t^2$, energy $J = |F|^2$ will be calculated:

$$J_0 = |E_0|^2 = 2RT^2\left(1 + \cos\left(\frac{2\pi}{\lambda}(2\overline{O_1P_1} - 2\overline{O_2P_2})\right)\right) \tag{8}$$

$$J_n = |E_n|^2 = \tag{9}$$

$$2R^{2n-1}T^2(T-R)^2\left(1 + \cos\left(\frac{2\pi}{\lambda}(2\overline{O_1P_1} - 2\overline{O_2P_2})\right)\right)$$

Thus, it can be understood that all $J_0$ through $J_n$ are the light beams interfering with the optical path length difference ($2\overline{O_1P_1} - 2\overline{O_2P_2}$), being independent of $l(\lambda)$.

This is because any one of the light beams reaching the point $D_n$ passes through the parallel planar plate 125 the same number of times ($2n+1$). Accordingly, it is unnecessary to place the correcting plate 8 equal in material and thickness to the substrate 4 beside the translucent film 5 formed on the latter 4 as in the conventional interferometer of FIG. 7. That is, an interferometer can be formed by arranging the parallel planar plate 125 and the reverse reflectors such as the corner-cube reflectors 123 and 124 as shown in FIG. 2. In the interferometer thus formed, the light beams are corrected in phase and subjected to interference with a predetermined optical path length difference.

Figure 9:
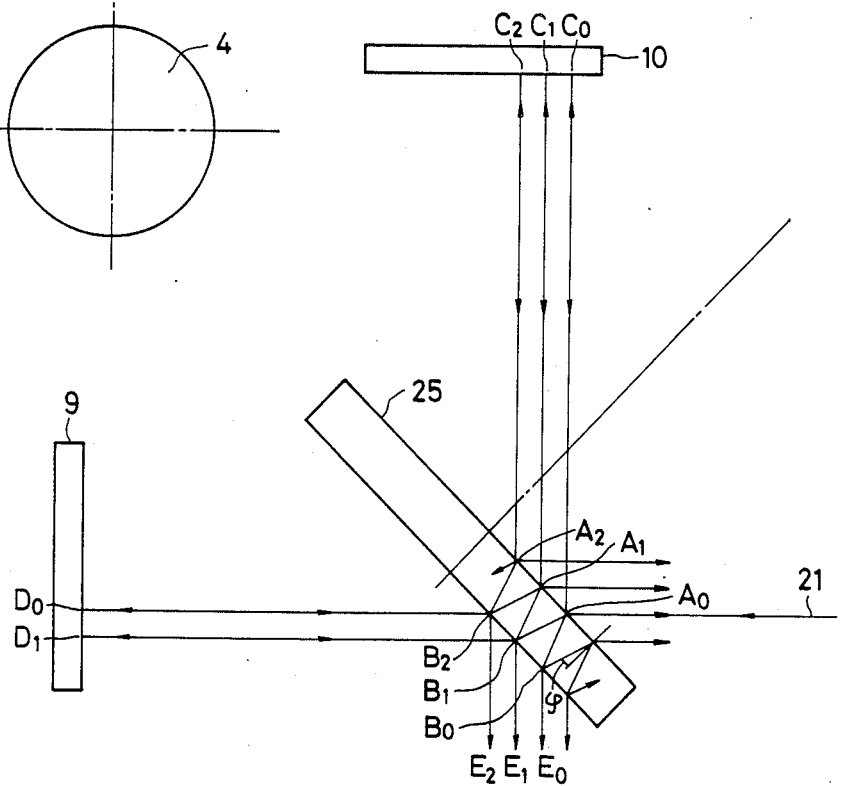
FIG. 9 is a diagram for a description of the operation of the beam splitter according to the present invention which is combined with plane mirrors.

An interferometer formed without using the reverse reflectors, i.e., an interferometer formed by using plane mirrors 9 and 10 instead of the reverse reflectors and the parallel planar plate 25 will be described with reference to FIG. 9, for a comparison. In FIG. 9, for instance the output $E_0$ includes a light beam $A_0C_0A_0B_0$, a light beam $A_0B_1D_1B_1A_0B_0$, a light beam $A_0B_1A_1C_1A_1B_1A_0B_0$, etc. These light beams are different in phase from one another. By way of example, the output $E_0$ can be calculated as follows: In the following calculation, $\psi$ is the angle of refraction of the refracted light beam $A_0B$.

$$E_0 = -rt^2 e^{\frac{2\pi i}{\lambda}(2\overline{A_0C_0}+l(\lambda))} + \qquad (10)$$

$$rt^4 e^{\frac{2\pi i}{\lambda}(2\overline{B_1D_1}+3l(\lambda))} +$$

$$r^3t^4 e^{\frac{2\pi i}{\lambda}(2\overline{A_0C_0}+l(\lambda)+4l(\lambda)\cos\psi)} +$$

$$r^2t^4 e^{\frac{2\pi i}{\lambda}(2\overline{B_1D_1}+3l(\lambda)+4l(\lambda)\cos\psi)} + \ldots$$

$$= e^{\frac{2\pi i}{\lambda}(2\overline{A_0C_0}+l(\lambda))}\left(-rt^2 + t^4\left(r^3 e^{\frac{2\pi i}{\lambda}4l(\lambda)\cos\psi} + \right.\right. \qquad (11)$$

$$r^7 e^{\frac{2\pi i}{\lambda}8l(\lambda)\cos\psi} + r^{11} e^{\frac{2\pi i}{\lambda}12l(\lambda)\cos\psi} + \ldots \bigg) +$$

$$e^{\frac{2\pi i}{\lambda}(2\overline{B_1D_1}+3l(\lambda))} t^4\left(r + r^5 e^{\frac{2\pi i}{\lambda}4l(\lambda)\cos\psi} + \right.$$

$$r^9 e^{\frac{2\pi i}{\lambda}8l(\lambda)\cos\psi} + r^{13} e^{\frac{2\pi i}{\lambda}12l(\lambda)\cos\psi} + \ldots \bigg)$$

Thus, a number of light beams different in phase interfere with one another. The output $E_0$ can be approximate with the highest in intensity of the light beams reflected by the stationary reflecting mirror 10 and the movable reflecting mirror 9 as follows:

$$E_0 \approx -rt^2 e^{\frac{2\pi i}{\lambda}(2\overline{A_0C_0}+l(\lambda))} + rt^4 e^{\frac{2\pi i}{\lambda}(2\overline{B_1D_1}+3l(\lambda))} \qquad (12)$$

The energy $S_0$ is as follows:

$$S_0 \approx RT^2(1 + T^2 + \qquad (13)$$

$$2T\cos\left(\frac{2\pi i}{\lambda}\left(2\overline{B_1D_1} - 2\overline{A_0C_0} + 2l(\lambda) + \frac{\lambda}{2}\right)\right)$$

This shows the interference of an optical path length difference of $2\overline{B_1D_1} - 2\overline{A_0C_0} + 2l(\lambda) + \lambda/2$. That is, $l(\lambda)$ still remains in the optical path length difference. Therefore, even if an approximation is made as in equation (12), the phase correction cannot be made. The above description can be equally applied to the remaining outputs $E_1$, $E_2$ and so forth. In conclusion, it is impossible to form an interferometer with the plane mirrors 9 and 10 and the parallel planar plate 25, and it is necessary to use the reverse reflectors 23 and 24 instead of the plane mirrors 9 and 10 as in the interferometer shown in FIG. 2.

In FIG. 2, the incident light beam is indicated by one line 21. On the other hand, in the conventional double beam interference spectrometer shown in FIG. 7, parallel light beams formed by the collimating reflecting mirror 3 are applied as incident light beams. In the case of a single incident light beam 121, the outputs $E_0$, $E_1$, $E_2$ and so forth, being independent of one another, cause no mutual interference; however, in the case where parallel light beams are applied as incident light beams, the mutual interference of the outputs must be taken into consideration.

Figure 3:
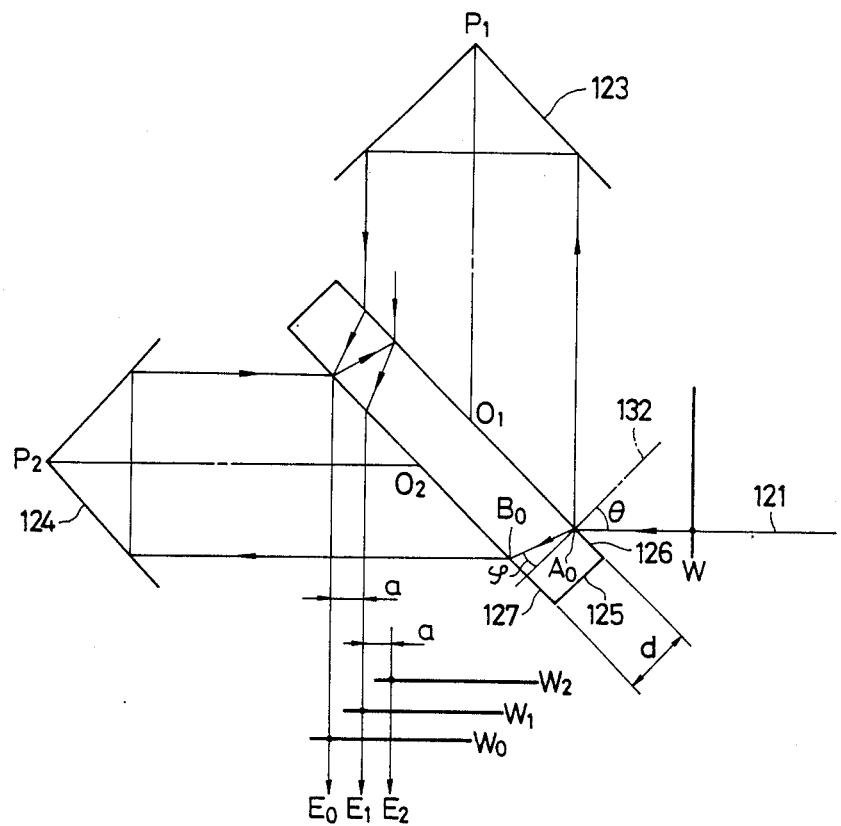

The case where, in the interferometer of the present invention, parallel beams are applied as incident light beams as shown in FIG. 3. In FIG. 3, a wave surface $W$ of an incident light beam 121 is subjected to division and interference by the parallel planar plate 125, the stationary corner-cube reflector 123 and the movable corner-cube reflector 124, thus providing wave surfaces $W_0$, $W_1$, $W_2$ and so forth which are emergent light beams of the interferometer. When the mutual interference of the wave surfaces $W_0$, $W_1$, $W_2$ and so forth is not taken into consideration, the intensities of the light beams can be represented by $E_0$, $E_1$, $E_2$ and so forth according to equations (3) through (7) with the incident energy being one (1). The wave surfaces $W_0$, $W_1$, $W_2$ and so forth thus provided occur at intervals of in a direction perpendicular to the direction of advancement of light. The interval a is:

$$a = 2 d \tan \psi \cos \theta \qquad (14)$$

where $d$ is the thickness of the parallel planar plate, $\theta$ is the incident angle of the incident light beam 21, and $\psi$ is the angle of refraction.

When the wave surfaces are shifted in a direction perpendicular to the direction of advancement of light as described above, the range of interference thereof depends greatly on the kind of light and the surface condition of the collimating reflecting mirror 3.

In the case where the incident light beam is a laser beam, the wave surface $W_0$ can cause interference substantially over its entire surface; that is, interference occurs wherever the wave surfaces $W_0$ and $W_1$ overlap each other. In the case of an ordinary light source, the lateral coherence is small. In the case where the beam collimation is made with a polished concave mirror, the coherence is sufficiently eliminated with a shift of the order of $\pm 500M$ for intermediate infrared rays, and with a shift much smaller for visible rays. Recently, it has been made possible to form a non-spherical mirror about 30 M in surface roughness by machining an aluminum material. With the mirror thus formed, the coherence is sufficiently eliminated with a shift of the order of ±100 M. In contrast, the lateral coherence can be limited by using a collimating reflecting mirror 3 having a suitable surface roughness, or by increasing the thickness of the parallel planar plate 125, or by increasing the incident angle $\theta$ of the incident light beam 121.

As is apparent from the above description, the outputs $E_0$, $E_1$, $E_2$ and so forth can be handled as independent light beams. Therefore, the interferometer of the invention can cause the parallel light beams emitted from the ordinary light source (which is not a laser source) to interfere with one another with the predetermined optical path length difference $2\overline{P_1O_1} - 2\overline{P_2O_2}$.

Let us consider the case where, with respect to the amplitudes of the interference signals represented by equations (8) and (9), the parallel planar plate 25 is of germanium (Ge). Germanium has an energy transmission degree of the order of 0.3 (T=0.3) for a reddish light beam 20 $\mu$ in wavelength. If the energy reflection degree R is set to 0.7 (R=0.7) with the absorption disregarded, then $$J = J_0 + J_0 + \ldots \tag{15}$$

$$= 2RT^2 \left( 1 + (T - R)^2 (1 + R^2 + R^4 + \ldots) \right) \left( 1 + \cos\left( \frac{2\pi}{\lambda} (2\overline{O_1P_1} - 2\overline{O_2P_2}) \right) \right) \tag{16}$$

$$= 2RT^2 \left( 1 + \frac{(T - R)^2}{1 - R^2} \right) \left( 1 + \cos\left( \frac{2\pi}{\lambda} (2\overline{O_1P_1} - 2\overline{O_2P_2}) \right) \right) \tag{17}$$

$$\text{Interference strength} = J_{maximum} - J_{minimum} = 4RT^2 \left( 1 + \frac{(T - R)^2}{1 - R^2} \right) \tag{18}$$

When R=0.7 and T=0.3 are inserted in equation (18), the resultant interference strength is 0.30. This is 71% of the maximum efficiency (2RT) 0.42 provided with R=0.7 and T=0.3. The wave surfaces $W_1$, $W_2$ and so forth are eclipsed because of the shift a. However, even with the first term (the wave surface $W_0$) of equation (18), the interference strength is 0.13, and at least 60% of the maximum efficiency is assured. For infrared rays in a range of wavelengths of from 2 $\mu$m to 10 $\mu$m, germanium (Ge) is substantially ideal because T is of the other of 0.5. When R=0.5, $2RT^2=0.25$, which is satisfactory being equal to the maximum efficiency. In practice, the amplitude of an interference signal is different from that which is provided by the above-described equation. In order words, in the case of an ordinary light source, as the optical path length difference $2\overline{O_1P_1} - 2\overline{O_2P_2}$ increases, the number of coherent rays is decreased, and accordingly, the output of the interferometer is also decreased. This is completely equally applicable to the prior art. Therefore, the magnitude of the interference signal is acceptable as was described above.

Figure 1:
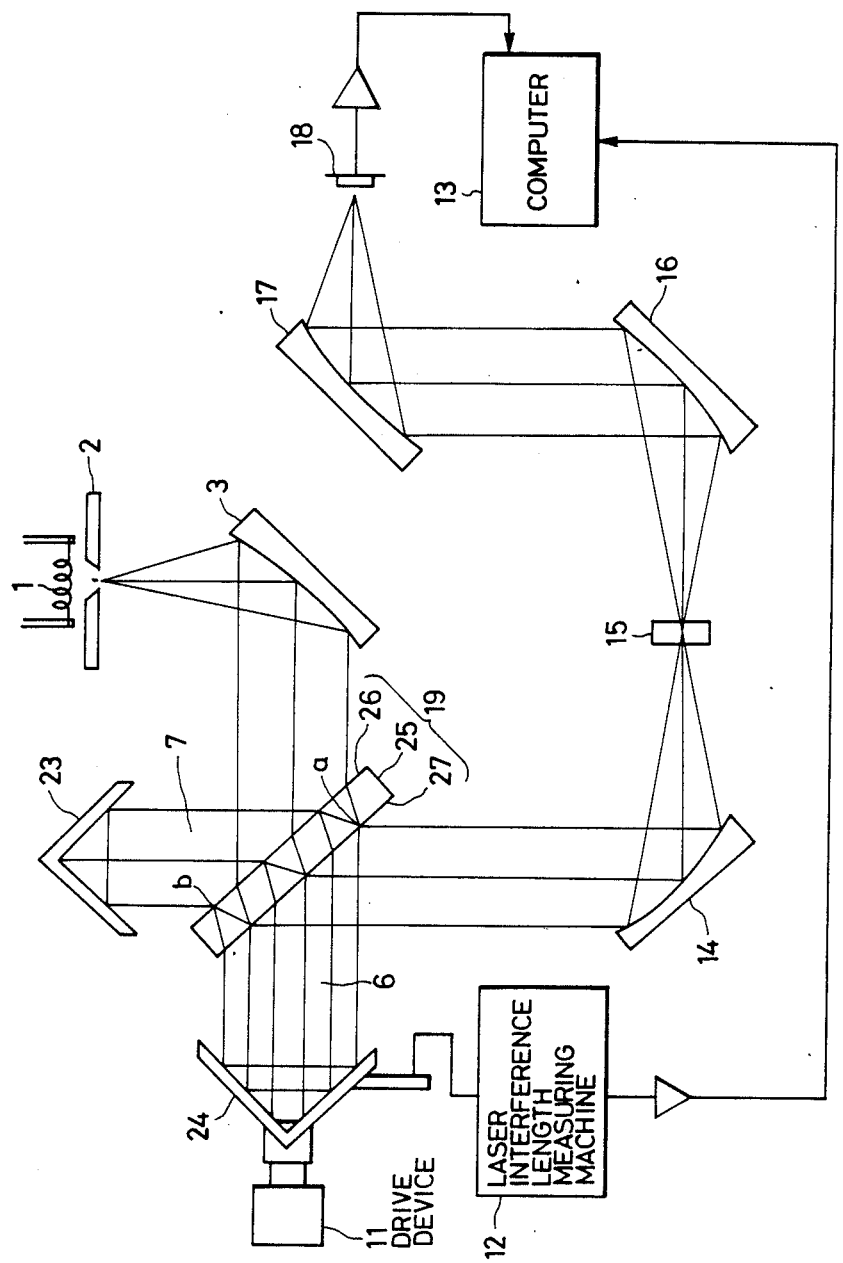
FIG. 1 is an explanatory diagram, partly as a block diagram, showing the arrangement of one embodiment of an interference spectroscope unit using an interferometer according to this invention.
Figure 7:
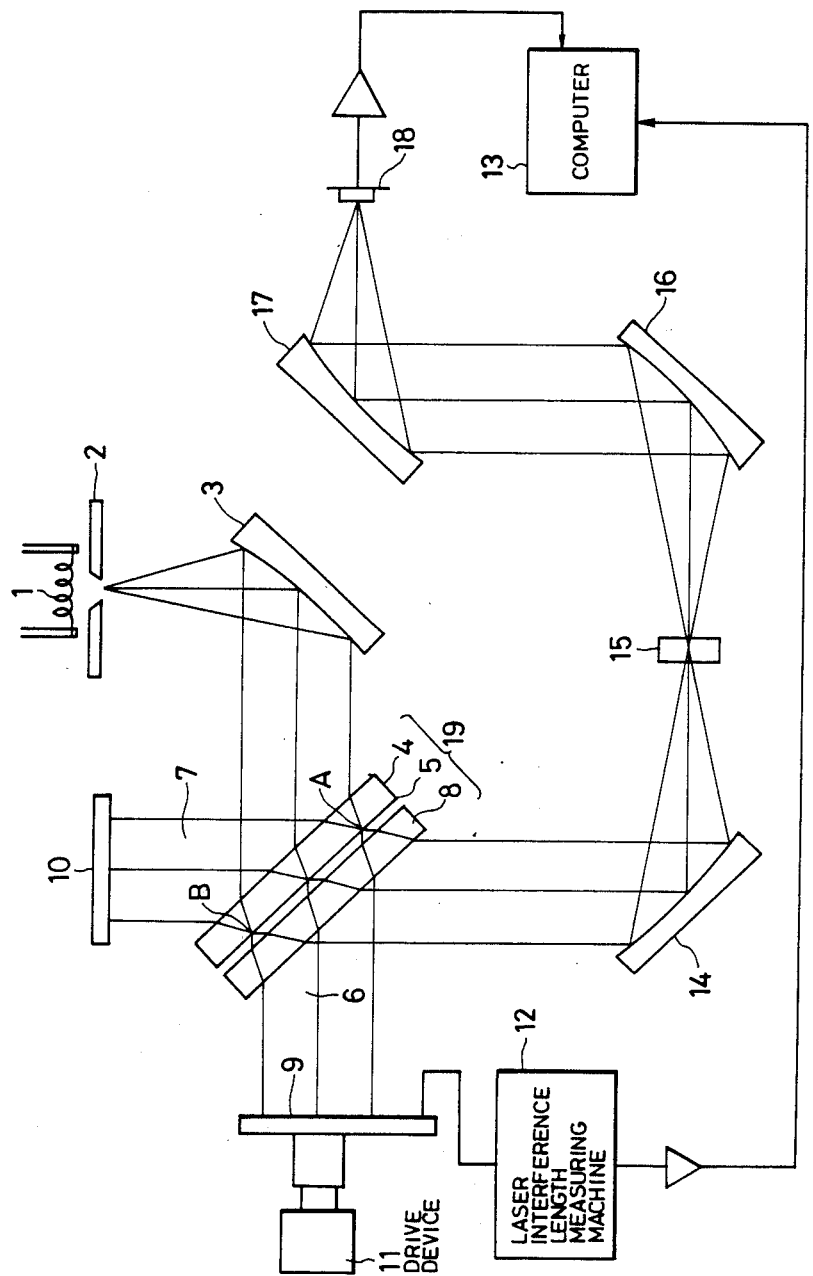
FIG. 7 is an explanatory diagram, partly as a block diagram, showing the arrangement of a conventional interference spectroscope unit with an interferometer.
Figure 8:
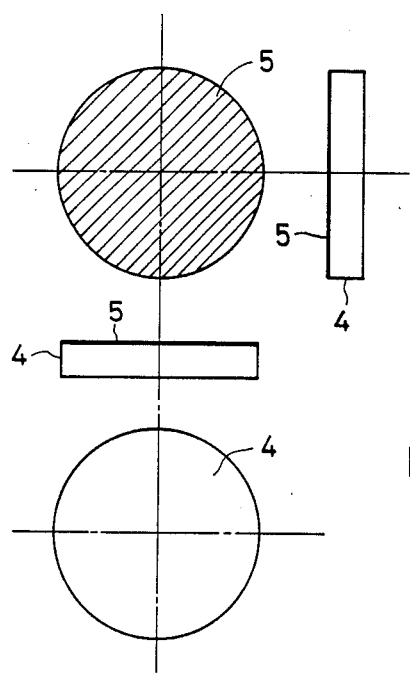
FIG. 8 is a diagram showing a conventional beam splitter.

One example of an application of the interferometer according to the present invention, to the double beam interference spectrometer of FIG. 7, is as shown in FIG. 1. The difference therebetween is apparent from comparison of FIG. 7 to FIG. 1.

In the double beam interference spectrometer of FIG. 1, it is unnecessary to use the correcting plate. This will contribute to reduction of the material cost and polishing cost of the beam splitter 19. Furthermore, in the conventional high resolution spectrometer, the tolerance in thickness for the substrate 4 and the correcting plate 8 is considerably high, being of the order of ±10 $\mu$m; on the other hand, in the present invention, the operation of making the substrate 4 and correcting plate 8 equal in thickness is completely eliminated. The operation, including repetitive polishing and measuring operations, takes a considerably long period of time. In this point, the effect of the double beam interference spectrometer of the present invention should be highly appreciated.

In addition, the conventional spectrometer of FIG. 7 requires the assembly of the substrate 4 and the correcting plate 8 with a spacer therebetween in a holder. During assembly, an air layer is formed between the substrate 4 and the plate 8. Therefore, a multi-beam interference occurs between the substrate 4 and plate 8, and light beams having certain wavelengths may often be absorbed. This deficiency may be eliminated by slightly inclining the substrate 4 and the plate 8 with respect to each other. On the other hand, in the spectrometer of the present invention, the above-described troublesome assembly task is eliminated; that is, the parallel planar plate is merely inserted into a holder. Accordingly, no multi-beam interference is caused. This will contribute further reduction of the manufacturing cost.

Furthermore, in the spectrometer of FIG. 1, it is unnecessary to form the translucent film 5. Beam splitter 25 in FIG. 1 requires no semi-reflecting film 5 to be formed on its surfaces, because it includes two semi-reflecting surfaces 26 and 27 which comprise the beam splitter 25 per se. In general, the vacuum deposition of the film 5 is performed while the substrate 4 is being heated. For instance in the case where a germanium translucent film is vacuum-deposited on the KBr substrate 4, the quality and strength of the formed film are in proportion to the temperature of the substrate 4. However, if the temperature is higher than a certain value, then the polished KBr substrate is deteriorated in surface roughness. This control is considerably difficult. In the spectrometer of the present invention, the troublesome control is eliminated, so that the manufacturing cost of the beam splitter 19 can be further reduced.

The elimination of the translucent film not only reduces the manufacturing cost but also improves the performance. In the conventional beam splitter in which for instance a germanium translucent film is formed on a KBr substrate by vacuum deposition, the interference of the germanium film is utilized, and the range of optical wavelengths in which light beams can be split with the germanium film is limited. For instance, the KBr substrate can transmit light beams in a range of from 400 cm$^{-1}$ (infrared rays) to 30000 cm$^{-1}$ (visible rays); however, when a beam splitter is made of a germanium film, the latter can transmit light beams in a range of from 400 cm$^{-1}$ to not more than 5000 cm$^{-1}$. On the other hand, in the invention, the light transmission range of KBr can be fully utilized. However, since, in this case, the refractive index of KBr is in the range of 1.5 to 1.7, and the reflectivity R is a few percent (%) in the case of vertical incidence, it is necessary to increase the incident angle thereby to increase the reflectivity. At any rate, a beam splitter effectively operating in a range of 400 cm$^{-1}$ to 30000 cm$^{-1}$ can be formed according to the present invention.

The material for the beam splitter is not limited to KBr only. For instance, KRS-5 or KRS-6 high in refractivity can be employed. In this case, the incident angle can be reduced.

In the above-described embodiment, the parallel planar plate is made of Ge or KRS-5; however, the invention is not limited thereto or thereby. For instance, a semiconductor material such as silicon or gallium arsenite, and a dielectric material such as zinc selenium (ZnSe) may be employed.

Figure 4:
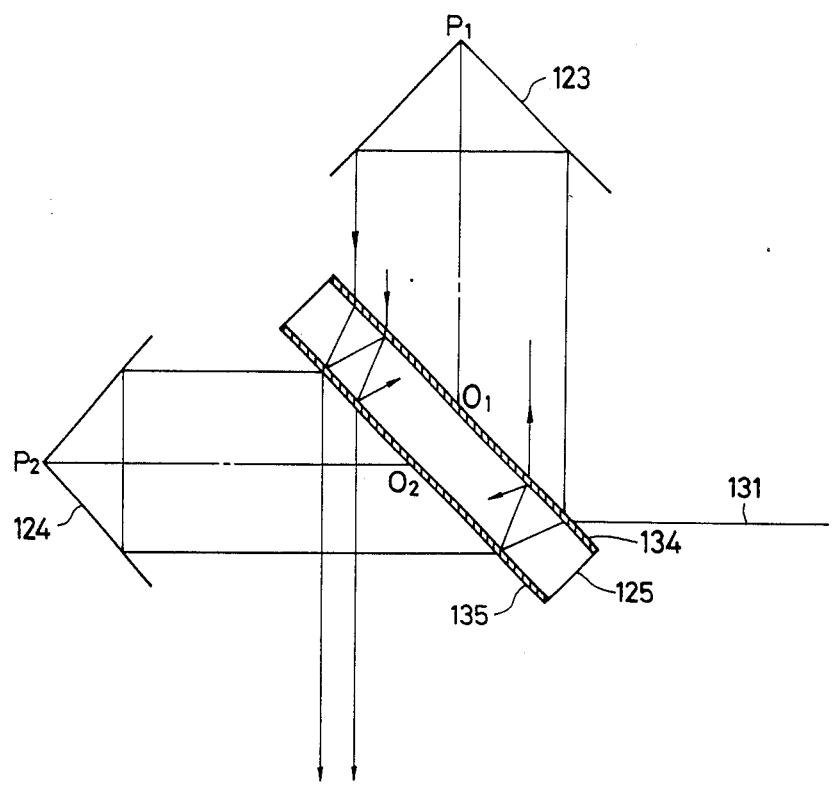
Figure 5A:
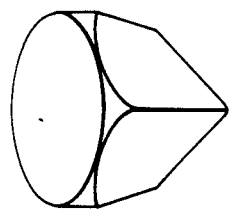
FIGS. 5A, 5B and 5C are diagrams showing embodiments of a reverse reflector, respectively.
Figure 5B:
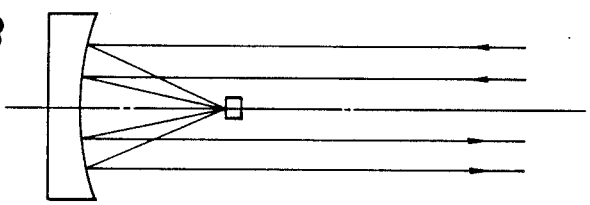
Figure 5C:
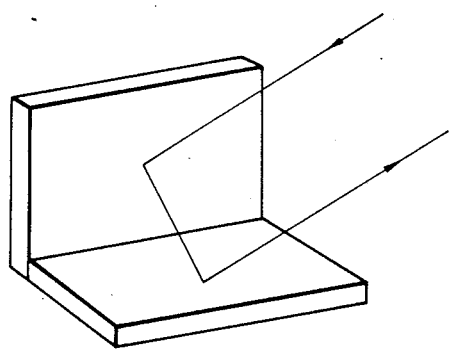

In the case where it is impossible to increase the incident angle, films 134 and 135 may be formed on both surfaces of the parallel planar plate 125 by vacuum deposition as shown in FIG. 4. In this case, the above-described advantage attributing to the elimination of the translucent film disappears; however, the merit due to the elimination of the correcting plate is still available. When the parallel planar plate 125 is compared with the substrate 4 of the beam splitter shown in FIG. 7 the former is inferior in manufacturing cost to the latter because the former has the vacuum-deposited films on both surfaces, while the latter has the vacuum-deposited film on one surface only. However, if a suitable jig is provided so that both surfaces of the plate are vacuum-deposited with the vacuum condition of the vacuum depositing device maintained unchanged, then the manufacturing cost will not increase as much.

Figure 16:
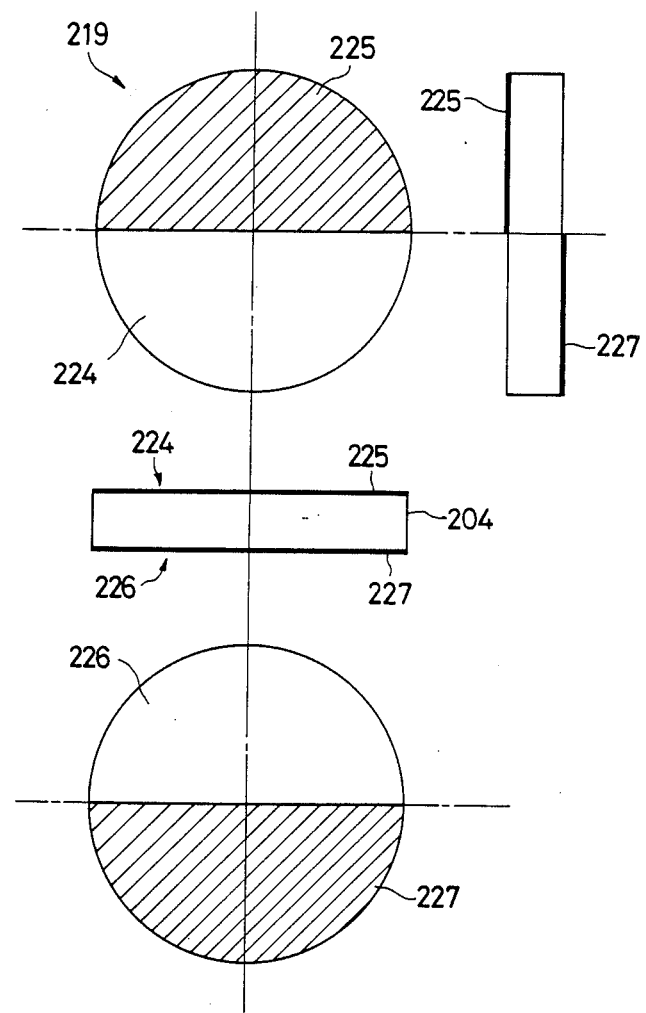

FIG. 16 shows another embodiment of the invention. In the embodiment, similar to the parallel planar plate of FIG. 4, translucent films are formed on both surfaces of a substrate 204; however, it should be noted that each surface is not entirely covered by the film. More specifically, as shown in FIG. 16, the upper half of the front surface 224 of the substrate 204, which is a parallel planar plate of transparent material, is covered by a translucent film 225, and the lower half of the rear surface 226 of the substrate 204 is covered by another translucent film 227.

Figure 17A:
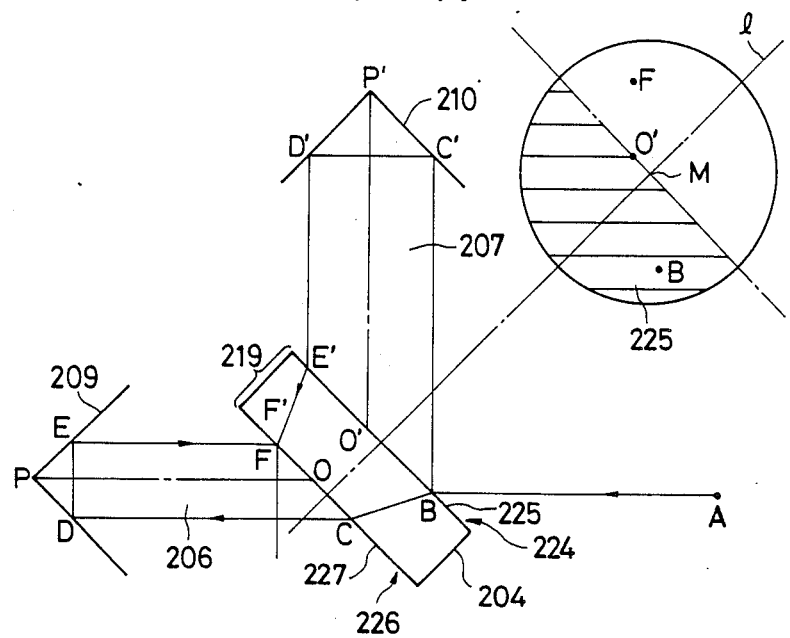
Figure 17B:
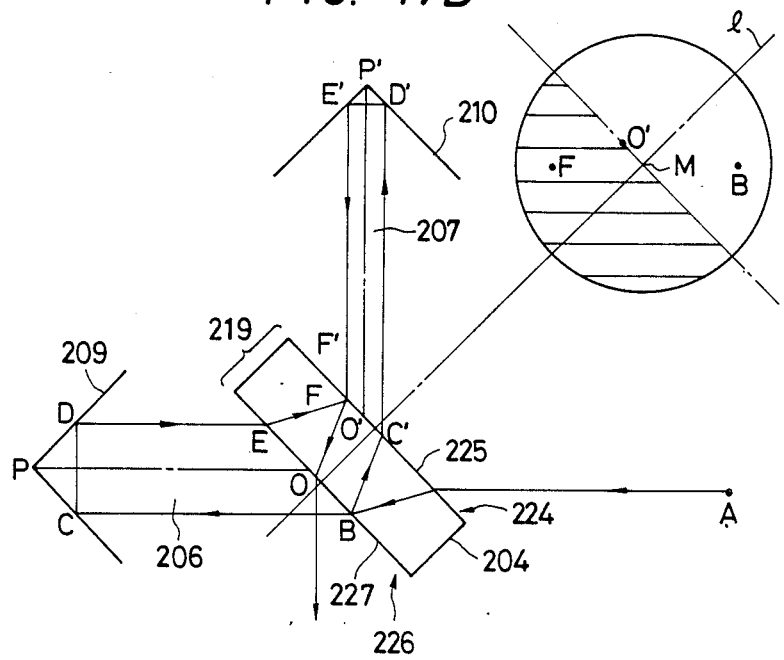

FIG. 17 is an optical path diagram of an interferometer which is formed by combining the beam splitter 219 shown in FIG. 16 together with the reverse reflectors 9 and 10. More specifically, in FIG. 17A, an incident light beam AB is applied to the translucent film 225 formed on the upper half of the front surface 224 of the beam splitter 219; and in FIG. 17B, an incident light beam AB is applied to the translucent film 227 formed on the lower half of the rear surface 226 of the beam splitter 219. In FIG. 17A, the incident light beam AB is split by the translucent film 225 of the beam splitter 219 into two light beams $\overline{BCDEF}$ and $\overline{BC'D'E'F'}$, and similarly as in the case of FIG. 2, the points F and F' coincide with each other to cause an optical interference. The light beams branching at the point B each pass through the substrate 204 once, so that they are corrected in phase. The above description is equally applicable to the case of FIG. 17B.

In the beam splitter 219, unlike the beam splitter in FIG. 2, the light beam is not frequently divided. Therefore, the beam splitter 219 is applicable to a light beam such as a laser beam high in coherence. Similar to the interferometer of FIG. 7, in the interferometer with the beam splitter shown in FIG. 16, it is necessary to subject the substrate to vacuum deposition for formation of the translucent films; however, the interferometer of the invention still has the above-described merits or advantages.

Figure 11:
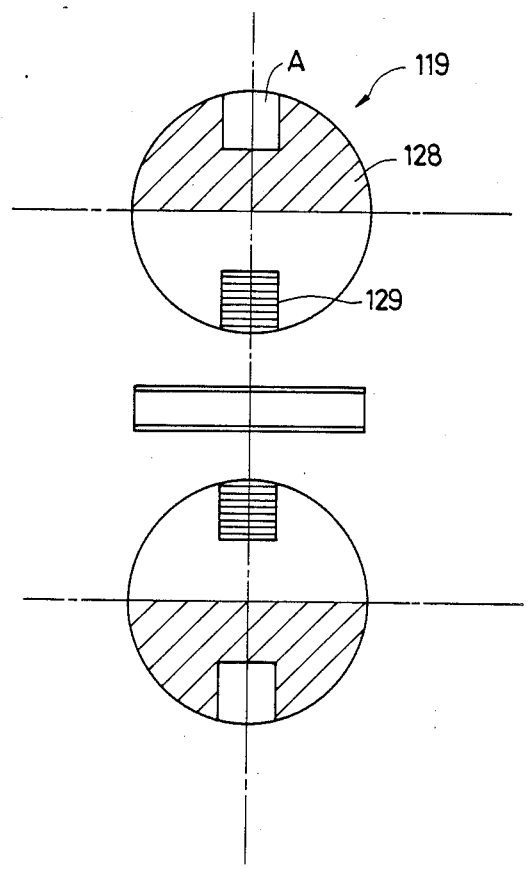

FIG. 11 shows another embodiment of the invention in which two kinds of translucent films, namely, a translucent film 128 for infrared rays (hereinafter referred to as "an infrared ray translucent film 128", when applicable) and a translucent film 129 for visible rays (hereinafter referred to as "a visible ray translucent film 129", when applicable) are formed on the substrate of a beam splitter 119. The beam splitter 119 is used for a laser beam outputted by a laser interference length measuring machine 12 in FIG. 1 or 7. In a conventional method of forming the translucent films, the position of the visible ray translucent film is limited to a region A in FIG. 11. On the other hand, according to a method of the invention, the infrared ray translucent film and the visible ray translucent film are clearly separated from each other, that is, when they are formed on the substrate, their masking regions are clearly separated from each other as is apparent from FIG. 11. This can eliminate various difficulties which are caused at the boundary between two kinds of translucent films formed according to the conventional method. The two kinds of translucent films are formed on both surfaces of the substrate in such a manner that those on one surface are symmetrical with those on the other surface. The beam splitter 119 thus formed can be used for simultaneous measurement of not only rays in an infrared range but also rays in a visible range.

Figure 12A:
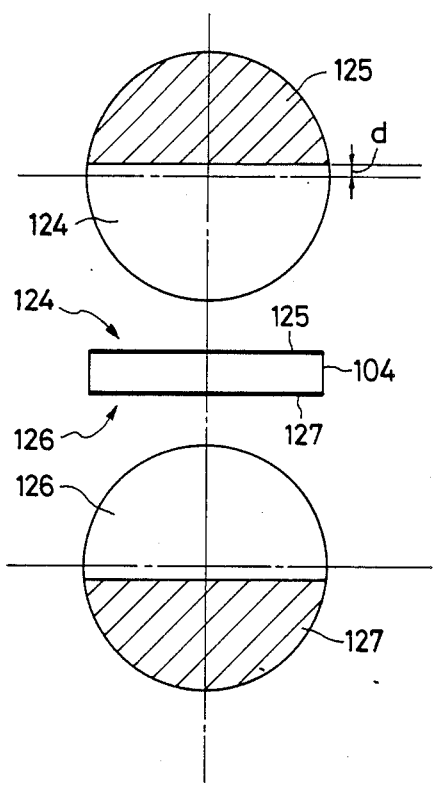
Figure 12B:
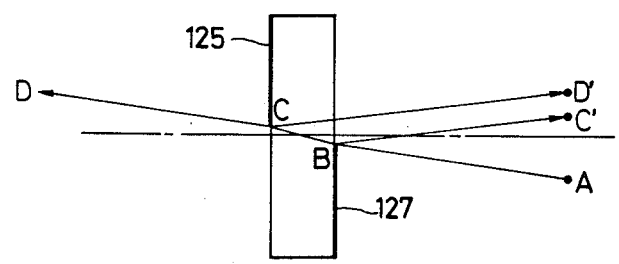

FIG. 12A shows another example of the beam splitter according to the present invention. The beam splitter of FIG. 12A is different from the beam splitter of FIG. 16 in that, in each of both surfaces of the beam splitter, there is a short distance d between the chord of a semi-circular translucent film (125 or 127) and the beam splitter's diameter parallel with the chord. FIG. 12B shows a modification of the beam splitter shown in FIG. 4. As was described before, in the interferometer of FIG. 1 or 7, the aperture 2 is finite in size, and therefore a light beam applied to the interferometer is not completely parallel; that is, it includes slightly inclined components (the inclination being not more than 3°). An inclined ray, as shown in FIG. 12B, is split at the point B and split again at the point C. Therefore, in the case where the translucent films are ideal ones, the intensity of the light beam CD is a quarter ($\frac{1}{4}$) of that of the light beam AB, and the intensity of the light beam C'D' is a quarter ($\frac{1}{4}$) of that of the light beam AB, and the intensity of the light beam BC' is a half ($\frac{1}{2}$) of that of the light beam AB. This provides difficulties in that the light beam CD to be used originally for optical interference is decreased in intensity, and the light beams CD' and CD interfere with each other. The decrease of intensity, being only a part of the intensity of the incident light beam, generally causes no trouble in operation; however, when a light beam applied substantially to the center of the beam splitter is considerably high in intensity, it will appear as a stray light beam. This difficulty can be eliminated by the beam splitter shown in FIG. 12A. For instance in the case where the refractive index of the substrate 4 is 1.5, the thickness thereof is 6 mm, and the angle of inclination of the incident light with respect to the parallel light beam is 3° in maximum, then because of the law of refraction $$d = \frac{6 \text{ mm} \times \tan\left(\sin^{-1}\left(\frac{\sin 30}{1.5}\right)\right)}{2} = 0.1 \text{ mm}$$

Figure 13:
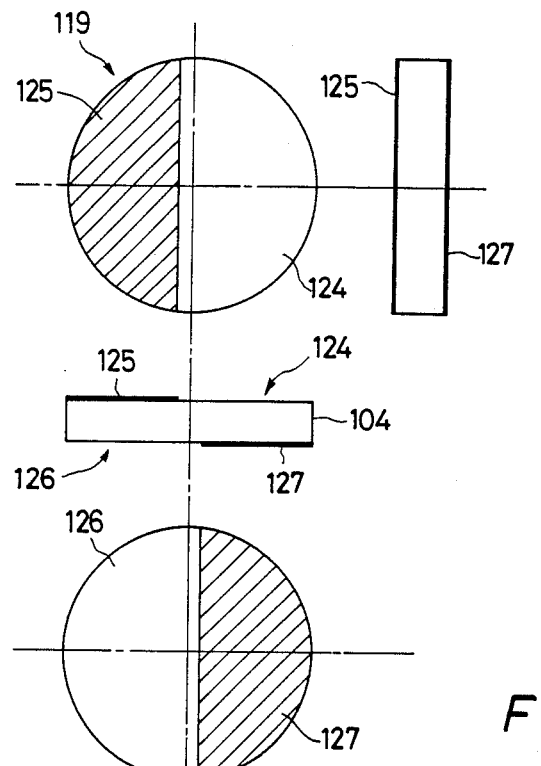
Figure 14:
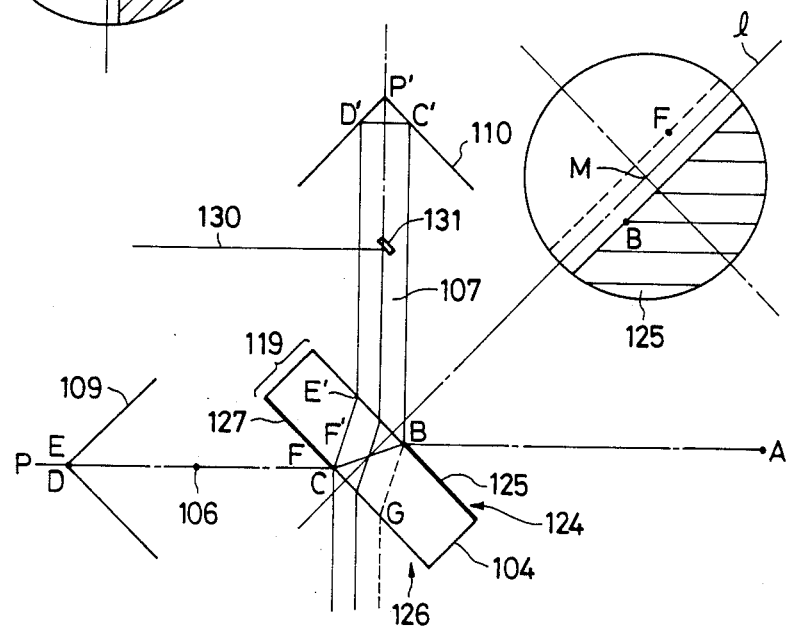
FIGS. 14, 17A, and 17B are explanatory diagrams showing the arrangements of other embodiments of the interferometer according to the present invention.

FIG. 13 shows another example of the beam splitter according to the invention in which translucent film are arranged vertically. FIG. 14 shows an interferometer using the beam splitter 119 of FIG. 13. In the beam splitter 119, a gap is provided between the translucent films 125 on the front surface of the substrate and the translucent films 127 on the rear surface so that an incident beam split at the point B may not be split again at the point C. In FIG. 14, a light beam split at the point B undergoes optical interference at the point F, and a light beam split at the point F undergoes optical interference at the point B, as a result of which the emergent light beam is shifted as much as CG. On the other hand, in FIG. 7, the illuminating mirror 14 and the converging mirror 16 are to measure a specimen 15 which is transparent. These mirrors are detachably mounted so that they are replaced by other optical devices such as those for measuring reflective specimens or light-scattering powder. In the replacement, it is necessary to adjust the optical axes of the optical devices. In the interferometer of FIG. 14, the shift CG is utilized so that an optical axis adjusting laser beam 130 is allowed to emerge by means of a reflecting mirror 131.

FIGS. 15A and 15B show other examples of the beam splitter according to the present invention. In FIG. 15A, the beam splitter is divided into a plurality of parts. In FIG. 16B, the optical axis is shifted.

In the above-described embodiments, the corner-cube reflectors 23 and 24 are employed as reverse reflectors as shown in FIG. 2. However, it goes without saying that other types of reverse reflectors can be employed. For instance, a corner-cube prism as shown in FIG. 10A, a reverse reflector called "a cat eye reflector" as shown in FIG. 10B, a mirror device composed of two plane mirrors combined as shown in FIG. 10C, or a triangular prism having two surfaces perpendicular to each other may be employed. The corner-cube prism is the corner-cube reflector provided in the form of a prism, and it is extensively employed for a range finder using a laser.

Figure 6:
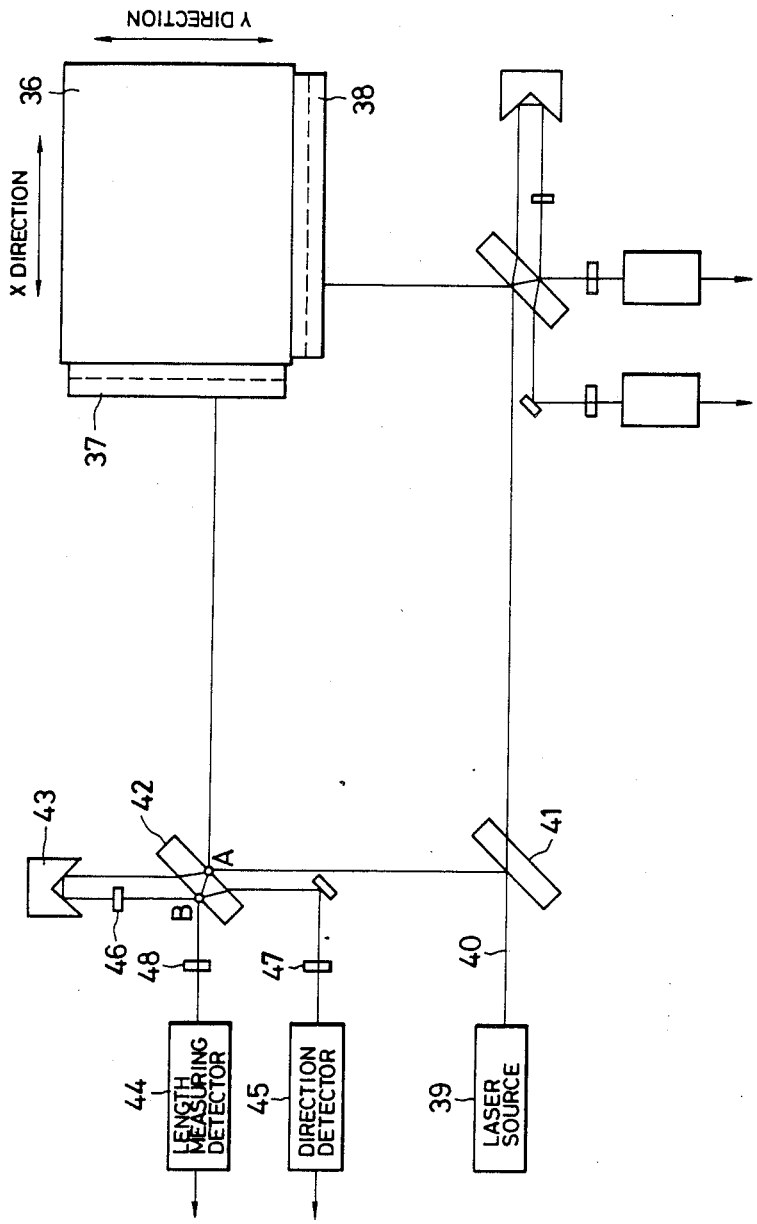
FIG. 6 is an explanatory diagram, partly as a block diagram, showing the arrangement of one application of the interferometer according to the invention.

The interferometer of the invention has many other applications. FIG. 6 shows one example of a distance measuring device to which the interferometer of the invention is applied.

In FIG. 6, an X-Y stage 36 is moved in the directions of the arrows by a drive motor (not shown). An X-coordinate reverse reflector 37 and Y-coordinate reverse reflector 38, which are of the type as shown in FIG. 10C, are attached to the X-Y stage 36. A laser beam 40 emitted from a laser source 39 is split into two beams by a beam splitter 41. One of the two beams is used for measurement of X-coordinates, and the other for measurement of Y-coordinates. A method of measuring X-coordinates is equal to that of measuring Y-coordinates. Therefore, only the former method will be described. The laser beam for measurement of X-coordinates is split into two beams at the point A by the beam splitter 42 of the invention. One of the two beams is reflected by the X-coordinate reverse reflector, and the other is reflected by a reference reverse reflector 43, thus undergoing optical interference at the point B on the beam splitter 42. After the optical interference, the beam reflected by the beam splitter is detected by a length measuring detector 44, and the beam passed through the beam splitter is detected by a direction detector 45. The laser beam 40, being a linearly polarized light beam, has P and S components with respect to the translucent film of the beam splitter 42. The P component is delayed as much as a ¼ wavelength by a ¼ wavelength plate 46, and is detected by the direction detector 45 with the aid of a polarizing plate 47. The S component undergoes optical interference with no phase shift, and is detected by the detector 44 with the aid of a polarizing plate 48. As is apparent from the above description, the outputs of the detectors 44 and 45 are shifted by about λ/4 in phase from each other, and the direction can be detected on the same principle as in a rotary encoder. In this operation, it is essential that the beam splitter 42 and the reference reverse reflector 43 are kept stationary. If, in the measurement, the beam splitter 42 and the reference reverse reflector 43 are moved, then the outputs are provided as if the X-Y stage were moved as much; that is, the measurement will include an error. A laser beam is monochromatic, and therefore chromatic dispersion of the material of the beam splitter will cause no trouble in operation. If, instead of the beam splitter 42, the conventional beam splitter without the correcting plate 8 is used, then the optical path length difference on its one side is changed because of the thermal expansion of the material. Therefore, in this case, it is necessary to form the beam splitter by using an expensive material which is small in thermal expansion. This difficulty may be eliminated by employment of the correcting plate. However, the use of the correcting plate involves the above-described disadvantages that the tolerance in thickness is extremely severe and accordingly the manufacturing cost is high. Therefore, the beam splitter 42 is made expandable toward the side of the point B with respect to the side of the point A, to completely eliminate the above-described difficulty attributable to thermal expansion. The beam splitter thus is simple in construction, and still has the above-described advantages.

As was described above, in the interferometer according to the present invention, the beam splitter which is the parallel planar plate with the translucent surfaces on both sides and one pair of reverse reflectors are employed in such a manner that a light beam split on the surface of the beam splitter undergoes optical interference on the other surface. Therefore, in the interferometer of the present invention, light beams formed by splitting an incident light beam travel the same distance in the substrate of the beam splitter before they interfere with each other. This produces the same effect as the correcting plate in the conventional interferometer. Thus, the interferometer of the present invention needs no correcting plate, and is therefore improved not only in manufacturing cost but also in performance.

What is claimed is:

1. An interferometer, comprising:
    a beam splitter having a planar plate with first and second opposing parallel sides, the total effective surface of each of said sides comprising a semi-reflecting surface for the transmission and partial reflection of light striking both semi-reflecting surfaces from the same side of the plate; and
    first and second reverse reflectors, each of said reflectors positioned a predetermined distance from an opposing one of said first and second sides having semi-reflecting surfaces.

2. An interferometer as claimed in claim 1, in which said parallel planar plate is made of a semiconductor material.

3. An interferometer as claimed in claim 2, in which said semiconductor material is germanium.

4. An interferometer as claimed in claim 2, in which said semiconductor material is silicon.

5. An interferometer as claimed in claim 2, in which said semiconductor material is a gallium arsenide.

6. An interferometer as claimed in claim 1, in which said parallel planar plate is made of an dielectric material.

7. An interferometer as claimed in claim 6, in which said dielectric material is zinc selenide (ZnSe).

8. An interferometer as claimed in claim 6, in which said dielectric material is thallium-bromide iodide (KRS-5).

9. An interferometer as claimed in claim 6, in which said dielectric material is thallium-bromide chloride (KRS-6).

10. The interferometer of claim 1, wherein said beam splitter substantially comprises silicon.

11. The interferometer of claim 10, wherein said light beam is an infrared ray having a wavelength greater than 1 μm.

12. The interferometer of claim 1, wherein said first and second reflectors each have a central optical axis.

13. The interferometer of claim 12, wherein said beam splitter and said first and second reflectors are arranged with a first intersecting point at an intersection of the first side of the beam splitter and the optical axis of the first reflector, and a second intersecting point at an intersection of the second side of the beam splitter and the optical axis of the second reflector; and a line passing between the first intersecting point and the second intersecting point passes through the beam splitter perpendicular to both the first and second side.

14. The interferometer of claim 13, wherein a light beam incident on the first side of the beam splitter is split into first and second beams, the first beam being reflected by the beam splitter to the first reflector, and reflected by the first reflector to be incident on the first side of the beam splitter, passing through the beam splitter to the second side, the second beam passing through the beam splitter to the second side, and reflected by the second reflector to be incident on the second side and recombined thereon with said first beam to form a single light beam departing the beam splitter.

15. The interferometer of claim 14, wherein said light beam is an infrared ray having a wavelength greater than 1 μm.

16. The interferometer of claim 1, wherein said light beam is an infrared ray having a wavelength greater than 1 μm.

17. An interferometer, comprising:
a beam splitter having a planar plate, including a first side, said first side having a plurality of semi-reflecting portions and a plurality of non-semi-reflecting portions, and an opposing second side, said second side having a plurality of semi-reflecting portions corresponding to the non-semi-reflective portions of said first side, and a plurality of non-semi-reflecting portions corresponding to the semi-reflecting portions of said first side; and
first and second reverse reflectors, each of said reflectors positioned a predetermined distance from an opposing one of said first and second sides.

* * * * *